(12) United States Patent
Mendiola (10) Patent No.: US 9,985,793 B2
(45) Date of Patent: May 29, 2018

(54) SYSTEM AND METHOD FOR DETECTING PREPAID INTERNET CONNECTION AND A CHARGING MECHANISM FOR SAME

(71) Applicant: CHIKKA PTE LTD, Singapore (SG)

(72) Inventor: Dennis Mendiola, New York, NY (US)

(73) Assignee: Chikka Pte Ltd, Singapore (SG)

( * ) Notice: Subject to any disclaimer, the term of this patent is extended or adjusted under 35 U.S.C. 154(b) by 627 days.

(21) Appl. No.: 14/360,290

(22) PCT Filed: Nov. 23, 2012

(86) PCT No.: PCT/SG2012/000442
§ 371 (c)(1),
(2) Date: May 22, 2014

(87) PCT Pub. No.: WO2013/077813
PCT Pub. Date: May 30, 2013

(65) Prior Publication Data
US 2015/0095217 A1   Apr. 2, 2015

(30) Foreign Application Priority Data

Nov. 24, 2011 (SG) ................. 201108719-4
Aug. 23, 2012 (SG) ................. 201206285-7

(51) Int. Cl.
*G06Q 40/02* (2012.01)
*H04L 12/14* (2006.01)
(Continued)

(52) U.S. Cl.
CPC ......... *H04L 12/1467* (2013.01); *G06Q 30/04* (2013.01); *H04L 12/1457* (2013.01); *H04M 15/8228* (2013.01); *H04M 17/02* (2013.01)

(58) Field of Classification Search
USPC ......................................................... 705/39
See application file for complete search history.

(56) References Cited

U.S. PATENT DOCUMENTS 6,182,122 B1 * 1/2001 Berstis .............. G06F 17/30902
707/E17.12
6,748,492 B1 * 6/2004 Rowlands ............. G06F 12/121
711/128
(Continued)

FOREIGN PATENT DOCUMENTS

CN    101855646 A    10/2010
EP     1509049 A1     2/2005
(Continued)

OTHER PUBLICATIONS

International Search Report, dated Feb. 19, 2013 for corresponding International Application No. PCT/SG2012/000442.
(Continued)

*Primary Examiner* — Chikaodinaka Ojiaku
(74) *Attorney, Agent, or Firm* — Intellectual Property Law Group LLP (57) ABSTRACT

A system for detecting and charging for internet connection provided to a computer device, the computer device configured to detect any internet connection available comprising an internet access adjustment facilitator arranged to receive requests for prepaid internet connection access from the computer device; and capable of facilitating the linking of the computer device to a designated prepaid internet account for purposes of charging; wherein upon detection by the software that the internet connection is a prepaid internet connection, access and caching of any Internet content will be chargeable to a designated prepaid internet account from the at least one prepaid internet account; and upon detecting that the internet connection is any other type of internet connection, the computer device caches any Internet content accessed by the user for synchronization with other computer devices in the system linked to the designated prepaid account.

33 Claims, 5 Drawing Sheets

(51) Int. Cl.
*G06Q 30/04* (2012.01)
*H04M 15/00* (2006.01)
*H04M 17/02* (2006.01)

(56) References Cited

U.S. PATENT DOCUMENTS

| | | | |
|---|---|---|---|
| 6,793,135 B1* | 9/2004 | Ryoo | G06Q 20/02 235/380 |
| 7,177,986 B2* | 2/2007 | Rowlands | G06F 12/0802 711/118 |
| 7,711,097 B2* | 5/2010 | Ji | G06Q 20/202 379/114.2 |
| 8,554,729 B2* | 10/2013 | Bolohan | G06F 17/30902 707/617 |
| 2002/0120564 A1* | 8/2002 | Strietzel | G06Q 20/102 705/40 |
| 2002/0169854 A1 | 11/2002 | Tarnoff | |
| 2003/0014367 A1* | 1/2003 | Tubinis | G06Q 20/12 705/64 |
| 2003/0060188 A1* | 3/2003 | Gidron | G06Q 30/04 455/406 |
| 2003/0101234 A1 | 5/2003 | McBrearty et al. | |
| 2003/0204443 A1* | 10/2003 | Knox | G06Q 20/123 705/14.35 |
| 2004/0058671 A1* | 3/2004 | Vallinen | G06Q 20/28 455/406 |
| 2004/0153576 A1* | 8/2004 | Hansmann | G06F 17/30902 709/248 |
| 2005/0060405 A1* | 3/2005 | Nathan | G06F 17/30017 709/225 |
| 2005/0228812 A1* | 10/2005 | Hansmann | G06F 17/30569 |
| 2006/0047804 A1 | 3/2006 | Fredricksen et al. | |
| 2006/0106890 A1* | 5/2006 | Paul | G06F 12/0815 |
| 2007/0061271 A1* | 3/2007 | Ala-Luukko | G06Q 20/382 705/64 |
| 2007/0271193 A1* | 11/2007 | Tan | G06Q 20/027 705/79 |
| 2009/0131025 A1 | 5/2009 | Sharma et al. | |
| 2009/0307132 A1* | 12/2009 | Phillips | G06Q 20/105 705/41 |
| 2011/0078043 A1* | 3/2011 | Ra | G06O 20/10 705/26.41 |
| 2012/0117026 A1* | 5/2012 | Cassidy | G06F 17/30053 707/634 |
| 2014/0081938 A1* | 3/2014 | Parker, III | G06F 17/3056 707/705 |
| 2014/0215459 A1* | 7/2014 | Tsirkin | G06F 9/45558 718/1 |
| 2015/0262155 A1* | 9/2015 | Mendiola | G06Q 20/145 705/40 |

FOREIGN PATENT DOCUMENTS

| | | |
|---|---|---|
| IE | 20020917 A1 | 6/2003 |
| JP | 2003141426 A | 5/2003 |
| JP | 2006 510116 A | 3/2006 |
| KR | 10-2000-0024368 | 5/2000 |
| KR | 10-2006-0080318 | 7/2006 |
| KR | 1020080016355 | 2/2008 |
| KR | 10-2010-0116259 | 11/2010 |
| TW | 200937322 A | 9/2009 |
| WO | WO 1997020413 A | 5/1997 |
| WO | WO 2002/052834 | 7/2002 |
| WO | WO 2004070616 A1 | 8/2004 |

OTHER PUBLICATIONS

Written Opinion, dated Feb. 19, 2013 for corresponding International Application No. PCT/SG2012/000442.

* cited by examiner

SYSTEM AND METHOD FOR DETECTING PREPAID INTERNET CONNECTION AND A CHARGING MECHANISM FOR SAME

FIELD OF THE INVENTION

The present invention relates to a system and method for detecting prepaid internet connection and a charging mechanism for same. The system and method are particularly suited, but not limited to detecting and providing a charging/billing mechanism for prepaid broadband service to computer devices including but not limited to personal computers, laptops, smart phones and tablets and will be described in this context.

BACKGROUND ART

The following discussion of the background to the invention is intended to facilitate an understanding of the present invention only. It should be appreciated that the discussion is not an acknowledgement or admission that any of the material referred to was published, known or part of the common general knowledge of the person skilled in the art in any jurisdiction as at the priority date of the invention.

Users of prepaid internet connection services (e.g. prepaid broadband services) typically have a fixed budget on accessing Internet content. Such prepaid broadband services are generally provided by a telecommunications carrier and are in the range of 2 to 5 Mbps.

An illustrative example of a prepaid broadband service may be packaged as the following to a subscriber and includes one or more of the following:

a Plug 'n Play installer and launcher; a prepaid account number display; Load Balance Counter (for counting how much prepaid credit is used or has lapsed); Call & SMS Capability (at extra charges); and free texts services.

The current charging/billing model of a broadband service may be based on a fixed number of surfing hours (example 120 hours valid for 5 days); or pay per use at 10 peso for every 30 mins.

A main drawback for users using prepaid broadband service is the race against time to access and download Internet content due to budget and time constraints. These constraints often meant that users' experience is compromised as there is not enough time to explore interested websites or Internet content. In addition, these time-based charging models as described above (colloquially known as pay-per-specific-time model) may be unfairly biased against people staying in relatively low network connectivity areas (e.g. villages, suburbs) as the internet connection speeds, example '3G' speeds experienced in relatively low network connectivity areas are far less than the specified actual 3G speeds.

The present invention seeks to provide a system and method that alleviates the above mentioned drawbacks at least in part.

SUMMARY OF THE INVENTION

In accordance with the first aspect of the invention there is a system for detecting and charging for internet connection provided to a computer device, the computer device configured to detect any internet connection available comprising an internet access adjustment facilitator arranged to receive requests for prepaid internet connection access from the computer device; and capable of facilitating the linking of the computer device to a designated prepaid internet account for purposes of charging; wherein upon detection that the internet connection is a prepaid internet connection, access and caching of any Internet content will be chargeable to a designated prepaid internet account from the at least one prepaid internet account; and upon detecting that the internet connection is any other type of internet connection, the computer device caches any Internet content accessed by the user for synchronization with other computer devices in the system linked to the designated prepaid account.

Preferably, where the internet connection is a prepaid internet connection, accessing of previously charged cached internet content will be free from further charges.

Preferably, where the internet connection is a prepaid internet connection, updating cached Internet content is chargeable to the designated prepaid account.

Preferably, where the internet connection is a prepaid internet connection, the computer device notifies the user of the computer device that any Internet content accessed will be chargeable to the designated prepaid account before incurring the charge.

Preferably, charging of the Internet content is based on a pay per action model. In such a case, the pay per action model ideally is activated by sending a request from the computer device to a server, the server operable to, upon receiving the request, toggle between an existing billing infrastructure which implements a pay-per-specific time model and an independent billing module implementing the pay per action model.

In addition, each subsequent action to update or synchronize internet content may be charged or billed based on a flat fee for a defined set of subsequent actions.

Preferably, the computer device is capable of caching and synchronizing the Internet content accessed.

In accordance with the second aspect of the invention there is a method for detecting and charging for internet connection provided to a computer device, the computer device configured to detect any internet connection available comprising the following steps:

a. detecting if the internet connection is a prepaid internet connection;
b. charging any Internet content accessed or cached to a designated prepaid account if the internet connection is a prepaid broadband connection; or
c. caching any accessed internet content without charging for the same upon detecting that the internet connection is other type of internet connection;

wherein the computer device caches any Internet content accessed by the user for synchronization with other computer devices in the system linked to the designated prepaid account.

Preferably, where the internet connection is a prepaid internet connection, accessing cached internet content previously charged will be free from further charges.

Preferably, where the internet connection is a prepaid internet connection, updating cached Internet content is chargeable to the designated prepaid account.

Preferably, where the internet connection is a prepaid internet connection the computer device notifies the user of the computer device that any Internet content accessed will be chargeable to the designated prepaid account before incurring the charge.

Preferably, charging of the Internet content is based on a pay per action model. In such a case, the pay per action model is activated by sending a request from the computer device to a server, the server operable to, upon receiving the request, toggle between an existing billing infrastructure which implements a pay-per-specific time model and an independent billing module implementing the pay per action model.

In addition, each subsequent action to update or synchronize internet content may be charged or billed based on a flat fee for a defined set of subsequent actions.

Preferably, the computer device is capable of caching and synchronizing the Internet content accessed.

In accordance with the third aspect of the present invention there is a computer device installed with software thereon, the software executable to perform the steps according to any of method according to the second aspect to detect and charge for prepaid internet access.

BRIEF DESCRIPTION OF THE DRAWINGS

The present invention will now be described, by way of example only, with reference to the accompanying drawing, in which.

Other arrangements of the invention are possible and, consequently, the accompanying drawings are not to be understood as superseding the generality of the preceding description of the invention.

PREFERRED EMBODIMENTS OF THE INVENTION

In the description of the embodiment, the term 'charge, chargeable, bill, billable etc.' is understood to be in reference to a designated prepaid internet connection service account such as a prepaid broadband service account, and the term 'free of charge' is construed accordingly.

Figure 1:
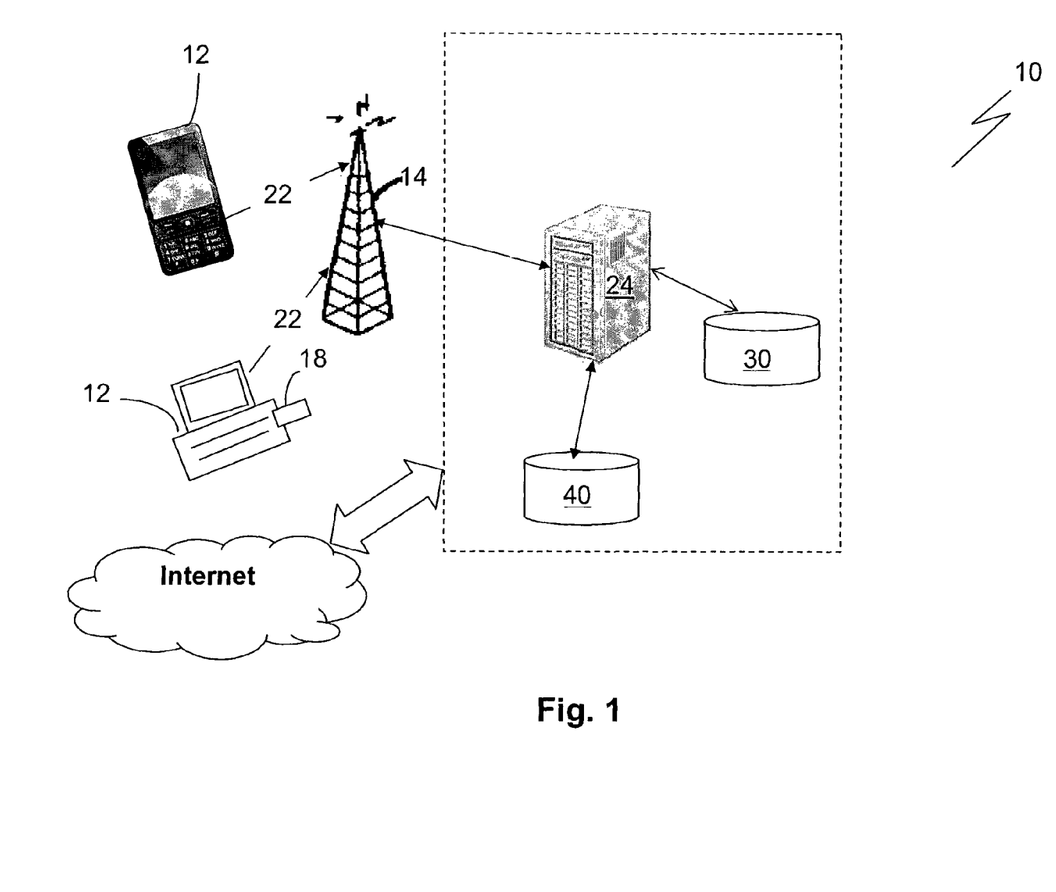
FIG. 1 is a schematic representation of a system for detecting prepaid internet connection service according to an embodiment of the invention.

In accordance with an embodiment of the present invention there is a system 10 for detecting prepaid internet connection and a charging mechanism for the same. In particular, within the context of the embodiment, the prepaid internet connection is exemplified as a prepaid broadband service. However, it is appreciated that a skilled person may easily adapt the system for other types of Internet connection including but not limited to mobile data (GPRS, EDGE, 2G, 3G, LTE), Wi-Fi etc.

The broadband service is typically provided by a telecommunications carrier 14. For illustration, telecommunications carrier 14 provides, among others, a prepaid broadband service plan. As an example, the prepaid broadband service plan may provide one or more of the following in the form of a package:
  a Plug 'n Play installer and launcher,
  a prepaid account with account number display,
  Load Balance Counter (for counting how much time is used or has lapsed), Call & SMS Capability (at extra charges), and free texts services.

Conventionally, the charging model of the prepaid broadband service may be based on a fixed number of surfing hours (example 120 hours valid for 5 days); or pay per use at for example 10 peso for every 30 mins. This invention seeks to modify the charging model such that it is less dependent on time but on the actual content assessed by the user.

The computer device 12 is typically (but not limited to) a desktop computer which is installed with an Internet access browser 16. Other types of computer device 12 include any device(s) capable of accessing and caching internet content such as smart phones, tablet PCs etc.

A user may purchase a plug in device 18 in order to access and use his prepaid broadband service. Alternatively, this may be provided in the broadband package. Such plug-in devices may be a USB dongle 18 installed with the relevant account details. It is appreciated that for computer device 12 such as smart phones or tablets, USB dongle 18 is generally not necessary.

Either the plug in device 18 or the computer device 12 may be installed with software 20. Software 20 is in data communication with an Internet access adjustment facilitator 24. Internet adjustment facilitator 24 may be disposed within the telecommunications carrier 14 or in any other hosts. Internet access adjustment facilitator 24 is arranged to receive requests for prepaid internet connection (broadband) access. Software 20 comprises functions and interface for a user to access his prepaid account 30 to:
  purchase additional time/prepaid credits;
  change user information and details such as user name and/or passwords;
  view usage details;
  archive and download a local copy of any Internet content accessed to a cache, the cache may be a memory space within the computer device 12 or an external server;
  Connection to the cache for viewing an archived list of Internet content accessed; and/or
  Synchronize the archive list of Internet content accessed with a server 40. The server 40 may be disposed within the telecommunications network or may be a third party server. The third party server may be a distributed server.

Software 20 is further configured to detect any existing broadband Internet connection, in particular whether the existing broadband Internet connection is provided via the designated prepaid account broadband connection (known hereinafter as "Popcorn connection") or other types of Internet connection which are not tied to the designated prepaid account 30; the other types of Internet connection including but not limited to Wi-Fi, GPRS, Enhanced Data rates for GSM Evolution (EDGE), 3G, LTE, 4G network etc. The detection mechanism may be via the plug in device 18, the telecommunications network or an application installed on the computer device based on criteria such as speed of network; software flag on the Internet access adjustment facilitator 24; monitoring of location of the subscribers/users based on location based services etc.

Software 20 comprises an interface which may be implemented as an internet browser, a browser extension or a browser app, such as the Google chrome browser, Google chrome extension or a Google chrome app for easy installation and usage by a user. Alternatively, software 20 may be a stand-alone computer program or an Android or iphone App where computer device 12 is a smartphone.

As an illustrative example, where Software 20 is implemented as a Google Chrome App, the user interface is similar to the Google Chrome™ browser. However, it runs as an App (hereinafter known as Popcorn App) and is capable of synchronizing and caching Internet content. When connected via a specific APN for the designated prepaid broadband service of telecommunications carrier 14, the Popcorn App will display "Popcorn Connection Active". When connected via other internet connection, for example Wi-Fi or regular data 3G, LTE etc, the Popcorn App either will not display anything or may display "other Internet connection active". The system 10 does not charge access of internet content to the user's prepaid broadband account if synchronization and caching of the Internet content is via other internet connection; or if the Internet content has been charged previously to the designated prepaid account 30 and resides in the archive list or cache of the computer device 12.

The Popcorn App may alternatively be implemented with an interface similar to the interface of Evernote™: i.e. comprising notebooks (or Categories) on the far left; a List of Internet content (for example web links) archived or "clipped" to the right; and a Preview plane. Software 20 is programmed such that the Preview plane will show the full content of a selected archived Internet content or clip only if it has been synchronized or paid for. However if the Internet content has not been synchronized, then a truncated version of the Internet content will be shown. A clickable icon or "View rest of page" allows the user to view the full Internet content upon synchronization, the synchronization either chargeable (if at Popcorn connection) or free (for other forms of broadband connection).

For Internet content such as video, it is to be appreciated that video is cached, streamed and buffered only upon clicking 'View' (chargeable on Popcorn connection). If the video is viewed/streamed on other internet connection such as Wi-Fi Connection, video is automatically cached and synced in the background (however the Popcorn App must be running).

Preferably, server 40 may be a server disposed within telecommunications carrier 14 or may be a third party server, such as for example a server hosting cloud services such as Google Drive, Dropbox™, or Microsoft™ Sky Drive. In such an instance, data may be archived indefinitely within the storage limit provided for example by Google Drive. Server 40 may comprise additional features to create folders with nested or sub-folders, upload new data, download data and delete. For example, Google Drive provides enough APIs to allow 3rd Party Access to Create a Folder, Upload New Data, Download Data, and Delete. New and Nested Folders within Google Drive are created on the fly as the User builds up his "Popcorn connection" archive.

As memory limits approaches on the server 40, the user may be prompted warnings along the lines of "You are running out of memory on your Google Account. Please delete files or Upgrade your Google Memory." Or "You have less than x GB memory left on your Hard Drive. Please delete files."

One example of how the archived list may be saved to the server 40 is to save the complete HTML data on the user's local drive then upload all the elements completely, unaltered to Google Drive. Future viewing will allow the HTML page to be viewed completely without formatting issues. (Any automatic Google conversion to a readable format on Google Drive, however, will alter the look and alignment of a page once viewed "locally" on Google Chrome.)

Where Google Drive is server 40, it is to be appreciated that the user cannot preview the files directly on Google Drive and the Popcorn App will be required.

Figure 3:
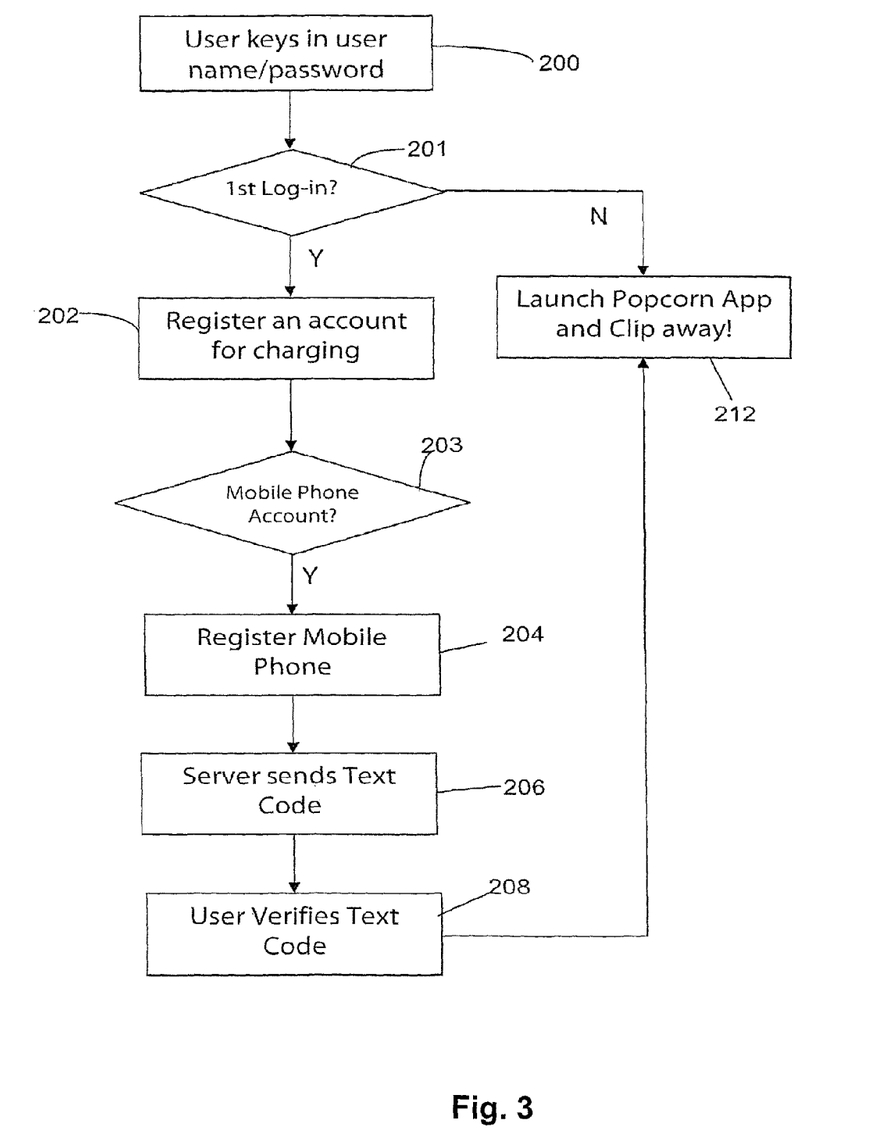
FIG. 3 is a flow chart illustrating a registration process for a first time user.

The invention will be described in the context of its use as follows:

A user having a prepaid broadband account with the telecommunications carrier 14 inserts the USB dongle 18 and logs in to a webpage to enter his user name and password in order to use the service (step 200). A user using Google chrome based web browser and associated extensions and apps may use the OAuth 2.0 protocol (by Google™) for authentication and authorization. The User is automatically logged into the Popcorn App once he signs into Google™ web browser using Chrome. The process of logging out is likewise automatic upon signing out of Google Chrome. The user may also log out of manually without logging out of his Google Account by explicitly 'Quitting'. It is to be appreciated that the above logging out process is a departure from how most Apps (and Extensions) work on Chrome, where App Log-Ins is independent of signing into one's Google Account. However, the inventors have specifically allowed such departure primarily to address potential Security and Privacy issues.

Upon authentication and authorization, the app checks if it is the first log-in (step 201). If it is the first log-in, the user is brought to a registration page that prompts the user to register at least one prepaid account (i.e. the designated account) for charging purpose (step 202).

The prompt may be as follows:

"We need at least one mobile phone for registration. This is where charges will be made. (Why do we need to charge?) Or you can use simply use your broadband Service # (Where is it?)"

If the user has a mobile phone account with the same telecommunications carrier, he may link his mobile phone account as part of the registration process (step 204). An example of mobile phone linking the mobile phone number to the prepaid account 30 comprises the steps as follows:

1. Please enter your mobile phone number here . . . then click Text Code (step 206)
2. Text Code is sent to mobile phone (step 208)
3. On the Mobile phone screen, the user will be prompted "Please enter CODE here then click 'Verify'. (No code? 'Resend' button shown.)" (step 210)
4. Upon entering of the code, the mobile phone is verified and may prompt the following message. "Congratulations! Start clipping away!" (step 212)

Once the user is logged on, he may start accessing Internet content via browsing or streaming, depending on the type of internet content. As the user is using prepaid account (popcorn connection), he is subjected to time and budget constraint while accessing Internet content. The caching function of the software 20 allows the user to 'click and archive' any Internet content accessed onto an archive list within the cache. For the convenience of the user, the caching function may be implemented as a clickable icon on the browser, similar to the 'Evernote™' chrome extension 'clipping' icon, the reading list of Instapaper™ or Apple™ IOS, or the Android™ 'Bookmark' button to save internet content for offline viewing.

If it is not the first time the user is using his/her designated prepaid account or once the registration step 204 is completed, the user launch the Popcorn App 20 that allows him to view any of the "clipped" notes and he would be taken automatically to the original link.

Figure 4:
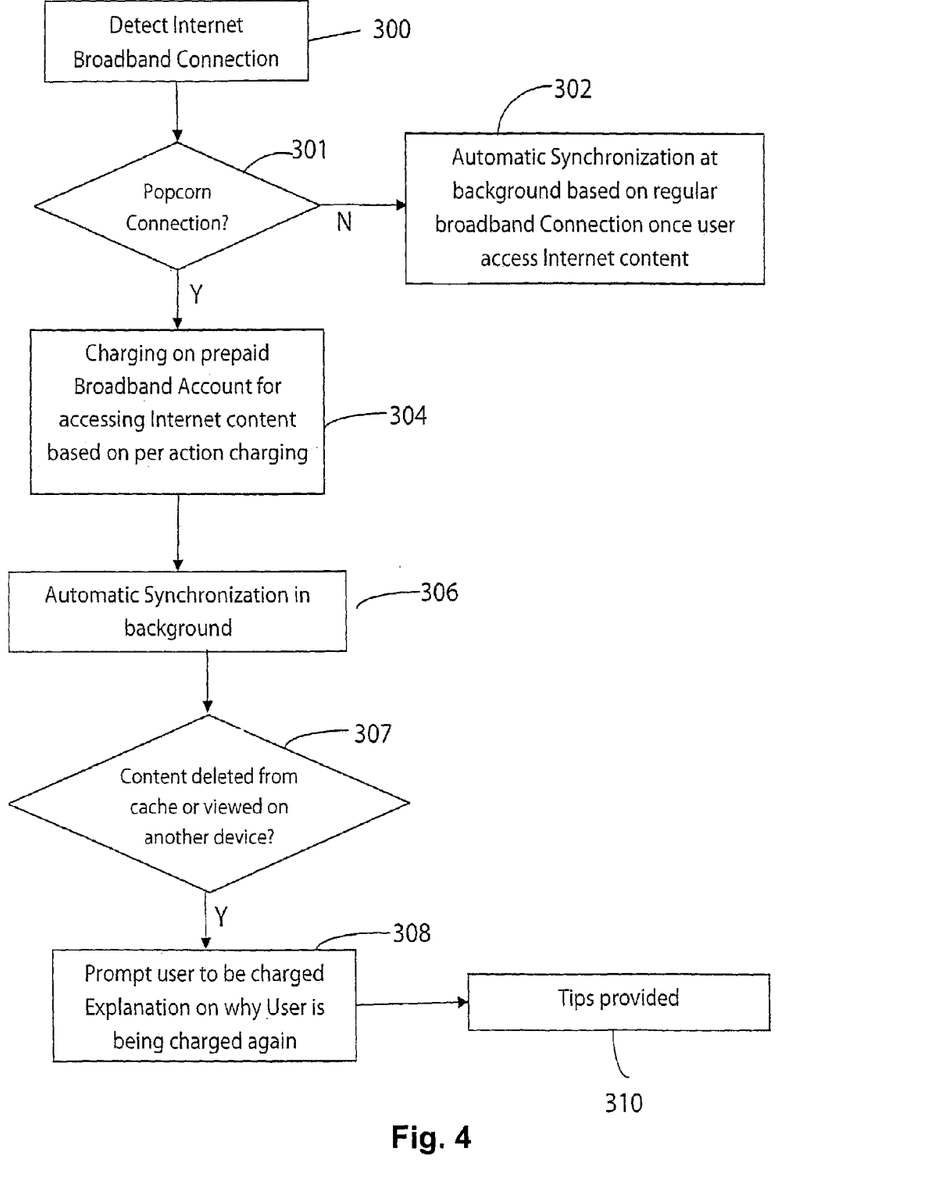
FIGS. 4 and 5 are flow charts illustrating the charging mechanism based on the type of broadband connection in accordance to an embodiment of the invention.
Figure 5:
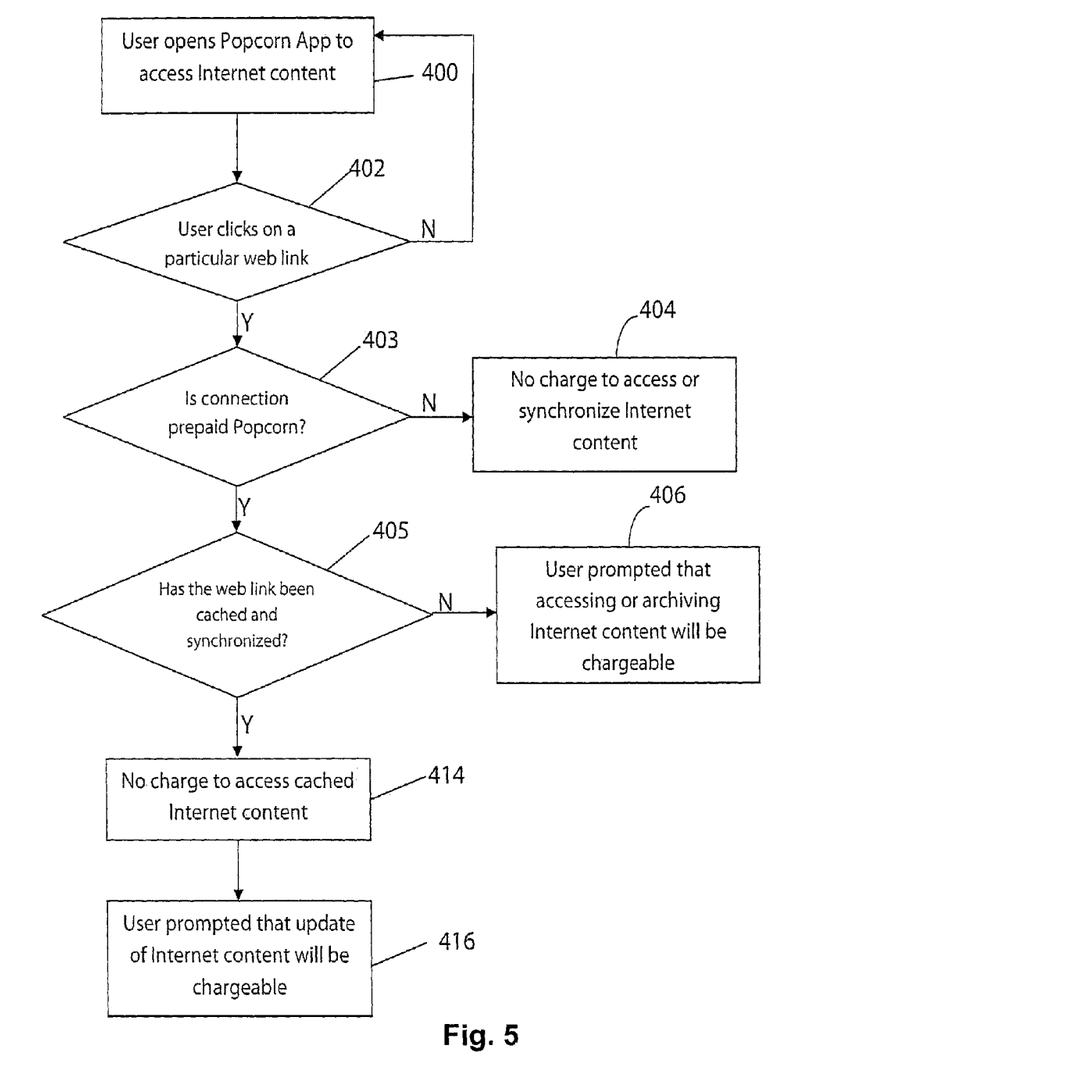

Once the user starts accessing Internet content, Popcorn app 20 detects if the Internet broadband connection is prepaid or others (step 300). Depending on source of the internet connection and/or whether Internet content has been cached previously, the caching and synchronization process will be chargable or free of charge. Various exemplary scenarios of the usage of the Popcorn App are described below:

The user may utilize the Popcorn App to pre-browse or pre-access any Internet content via view, scroll, and browse as he normally would any regular website (step 400). This may be in the form of HTML links or thumbnails of the original internet content may be displayed. On a visible location on the App (for example on the top right upper corner), a clickable button may allow the user to "View Original". (Step 402) Clicking on the 'View Original' button takes the user to actual web resource/content via the URL if the internet connection is a non-designated prepaid account (step 404). However, if the user is running on the Popcorn Connection and if the original content has not been cached or synchronized before (step 405), clicking on "View Original" triggers a prompt as follows (step 406):

"You are running on Popcorn Connection. You will be charged P1.00 to view the Original webpage/website. Do you want to view the Original?"

Similarly, if the user chooses to click on HTML links and navigation of other HTML pages within the Popcorn App and is within Popcorn connection, he may be prompted the following:

"You have not clipped this page. You will be charged P1.00 if you proceed. Continue (where 'continue' is a clickable link/button)" (Step 406)

However, if the user has clicked on a URL link previously and a synchronized copy of the page is on cache (step 405), he will be brought to the cached HTML page at no further charge to the designated prepaid broadband account (step 414). Details on when the page was last updated will be displayed in the form of "Page last updated on date dd/mm/yyyy." The user may be optionally prompted to update the Internet content via a clickable button at further cost if he so wishes. Prior to being charged, a prompt such as: "Update" is chargeable if the user is on a popcorn connection. (Step 416) may be displayed to the user.

The user may choose to download the popcorn chrome extension (Extension) as an addition to the popcorn chrome app. When the user installs the popcorn App, by default the popcorn chrome Extension is automatically installed as well. If he just installs the Extension, he is asked if he would like to download the App too. (The user may choose not to install the Extension especially if his main App is running on another computer device 12.)

The interface of the Extension may include similar features to that of Evernote™. If the user clicks on the Extension Button while on assessing content on a website, the following happens: 1) The icon displays a rotating syncing icon suggesting that Clipping has begun and is in process, and (2) once clipped successfully, we say: "Clipped! View now—a clickable button"

If the user is on Popcorn Connection and he clicks on any HTML link for the first time, he sees a Pop Up message by the Chrome Extension Icon "You are on Popcorn Connection, if you proceed, you will be charged P1.00. Proceed anyway?"

If the user decides to proceed with the Popcorn connection, charging of the prepaid broadband usage occurs on a click-by-click basis.

Optionally, a notification in the form of a counter appears and then disappear indicating "P2.00" . . . "P3.00" and so on. Such a notification avoids "bill shock" or "Nakaw load".

In light of the counter notification, there is no need to click on the Extension button each time he goes to another page while on Popcorn Connection.

The user is automatically logged into his Extension Account upon signing into his Google Account using Chrome. Ending the session is likewise automatic upon signing out of Google. He can also end his session manually for example by placing his cursor on the Extension Icon and then right clicking on 'Exit'.

If the user accesses Internet content via other internet connection other than establishing an Internet connection via the designated prepaid account, there will be no charge on the designated prepaid account and all archived Internet content will be synchronized on the server 40 automatically (step 302).

If the user accesses Internet content via the designated prepaid broadband connection (or also known as Popcorn Connection), caching occurs once the user clicks to view a link. The designated prepaid account is charged for clicking to view (step 304). But once charged for the "view", syncing occurs automatically in the background (step 306) and continue to synchronize without extra charge even if the Popcorn connection is interrupted.

It is to be noted that once the Internet content is viewed, the user will not be charged again for viewing the same Internet content (updating of Internet content does not fall within the definition of 'same' Internet content) since the assumption is that the content has been paid for and cached already (or accessed via Wi-Fi connection). However, this won't be the case if either of the following two things is true:
a) the cached data has been deleted by the user, or
b) the cached data is viewed on another computer device.

In this regard, if a user is about to be charged again for the same internet content under scenario (b), he will be asked, "You have previously downloaded this file, but it doesn't exist on this computer. Are you sure you want to view this again? You will be charged X dollars" Optionally the software 20 provides a clickable link to anticipate the user's question on "Why am I being charged again?" (step 308)

If the user clicks on the clickable link, tips will be offered on how to save on charges for viewing the same content multiple times (step 310). For example, the user may be prompted to use same computer device, or if he chooses to use another computer device, he will be recommended to transfer the Internet content files to a USB drive or other suitable portable data storage device. Instructions will be provided, along the lines of "This is where your files are located. You may copy these files on your USB drive and put in your other computer devices . . . "

To allow the user to import new files from a USB drive or portable data storage device to a computer device for proper syncing, the user may choose to save the content on a local section of the Popcorn App which may take the form of either a default location for another location.

An added consideration for the transfer of files from one computer device 12 to another is that the importation of files has to always be encrypted or otherwise not viewable by any other person who uses the same computer device 12. (Since this product is aimed at the Prepaid PC user, an assumption has to be made that the user may share a computer or goes to Internet cafes.)

To view cached files, the user should have the App running and be logged into his prepaid Account, which may be linked to his Google account.

Instead of pure encryption on a file to file basis, lockable (and perhaps, encrypt-able) folders may be considered, e.g., c://local/Application Data/User/CCCC. Lockable Folders may be used since Google Drive is likely to be used for "cloud storage", with local copies being synchronized with and downloaded into the lockable local folder.

Figure 2:
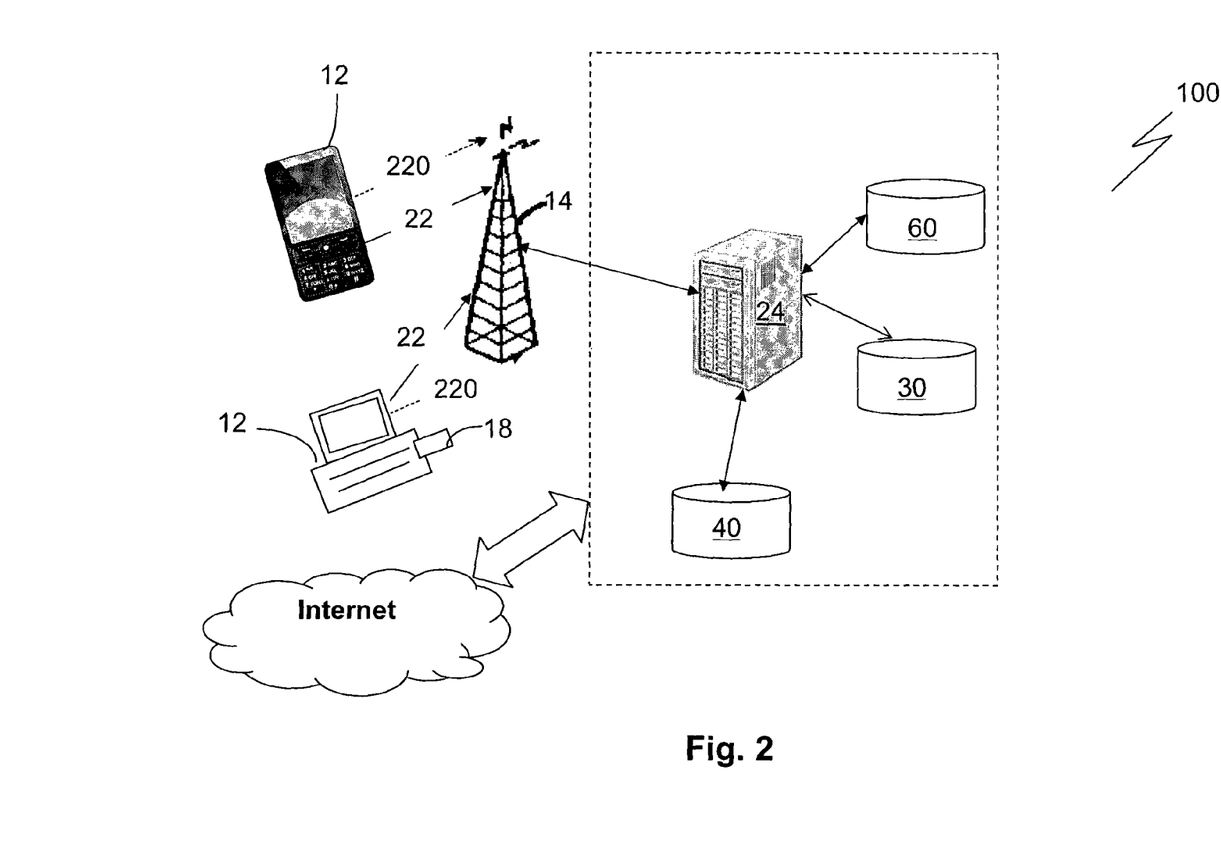
FIG. 2 is a schematic representation of a system for detecting prepaid internet connection service with a separate and independent pay-per-action billing infrastructure in accordance with another embodiment of the invention.

In another embodiment of the present invention, as illustrated in FIG. 2, wherein like reference numerals designate like parts, there is a system 100 for detecting prepaid internet connection and a charging mechanism for the same. The system 100 comprises an independent billing/charging module 60. The billing module 60 is an independent separate value-added billing module based on the mechanism of 'per action charging'.

Independent billing module 60 is operable to be in data communication with the prepaid account database. Independent billing module 60 is arranged to provide a 'per action charging' mechanism for charging/billing a subscriber for his Internet bandwidth usage. The independent billing module 60 is advantageous because it does not require modifications to the existing billing charging structure/database and may be implemented as a convenient 'add-on' to the existing resources.

'Per action charging' is a charging model based on an action taken by the subscriber. Non-exclusive examples of such action(s) are defined as follows:

i. Updating one's status on Facebook™ or other social networking sites including Tweeter etc.

ii. Viewing an up-to-10-minute video or 'flick' on Youtube™; In this regard, billing or charging occurs once for a full download and viewing, i.e. the bill/charge is the same regardless of how long the video takes to download or begins to stream. This is to be contrasted from charging methods where the end user is charged based on time taken for download.

iii. Uploading images/videos in social networking sites (Similar to the Youtube™ viewing example, the bill/charge to the user is the same regardless of how long it takes for a photo to upload or how big a file the upload entails.) and/or iv. Any other actions which the user, the application developer, or the telecommunications network service provider may define. This may include toll free downloads of mobile applications ("apps") but usage of these apps to perform subsequent functions (including i to iii above) may be chargeable on a per action basis.

In the context of the embodiment, other actions which may fall within the definition of 'per action charging' may include 'per click within dedicated smartphone 'App'; per click within web browser etc.

'Per action charging' offer additional choice for a pre-paid subscriber as it allows the pre-paid subscriber to choose from the conventional 'pay-per-specified time' model ('pay-per-specified time' mode such as 10 pesos for 30 minutes of Internet connection, and/or the daily "always on" access to only social networking sites such as Facebook™ or Twitter™ for 20 pesos daily) to the 'per action charging' model depending on his preference such as time, location and/or usage.

In this embodiment, the previously discussed 'Popcorn App' may include an additional function which allows a subscriber of computer device 12 to toggle between the 'pay-per-specified action' charging/billing models to the 'per action charging' charging/billing model.

A request 220 for switching to per action charging may be found in any form of an electronic signal/message including simple text or Short Messaging Service (SMS), Unstructured Supplementary Service Data (USSD) messages or any wherein a software application is installed on the computer device 12 for such a purpose.

The embodiment with emphasis on the usage of the billing module 60 for charging/billing a subscriber's data bandwidth usage will next be described in the context of its use.

Upon detection that 'per action charging' is to be adopted via a request 220 from the user of computer device 12, the existing billing infrastructure of the telecommunications carrier 14 is switched to the billing module 60. This may be achieved by either:

a. switching off the existing billing infrastructure; or
b. defining the Internet connection as a zero tariff (equivalent to no charge on existing billing infrastructure).

The billing module 60 then takes over the billing/charging based on per action charging once detected that the computer device 12 is under prepaid broadband connection.

It is to be appreciated that 'charge per action' may include the following 'Per click within app' or 'per click within web browser" and "per click within program' 'Per app running always on, for specified period' and/or 'per set of apps running always on, for specified period'.

The advantages and benefits of the described invention may be illustrated with the following case examples:

a. A student may go to an Internet cafe and login to his pre-paid popcorn account using the browser/browser app form. He may then begin to perform his research by clicking on a number of URL links (for example Wikipedia™). Each link is chargeable but once clicked the link/webpage may be cached and the user prompted to save the cached data in the portable storage device/USB device. As each link has been charged, subsequent access to the link will not be chargeable under popcorn connection and the user may then take his time (without further broadband access required) to look through the cached material in detail.

This is far more beneficial to the subscriber/user instead of the user time-based charging model where he has to race against time to read through the materials contained in the URL links.

b. A subscriber/user may access streaming video content from broadcast website such as Youtube™. Based on the popcorn connection, the video is chargeable only when the video content is cached, streamed and buffered only upon clicking 'Play' on the website. The subscriber may then organize the streaming content in a Youtube™ playlist for viewing later (provided that the playlist browser is not closed).

In the above scenarios, the subscriber/user may also utilize free internet connections at designated shopping malls etc. to synchronize or updates the cached internet content so further charges to the designated prepaid account is not incurred.

It should be appreciated by the person skilled in the art that the above invention is not limited to the embodiment described. In particular, the following modifications and improvements may be made without departing from the scope of the present invention Computer device 12 may be a smartphone or tablet computers. In such instance a USB dongle will not be necessary. Examples of smartphones includes (but is not limited to) phones running on Android™ based platform or Iphones™

It is to be further appreciated that various aspects of the embodiments as described may be combined to form further embodiments without departing from the scope of the invention.

The claims defining the invention are as follows:

1. A system for detecting and charging for internet connection provided to a computer device of a user, the computer device configured to detect any internet connection available comprising:
   an internet access adjustment facilitator arranged to receive requests for prepaid broadband connection access from the computer device; and capable of facilitating a linking of the computer device to a designated prepaid internet account for purposes of charging;

wherein upon detection that the internet connection is a prepaid broadband connection, caching of any Internet content accessed by the user will be chargeable to the designated prepaid internet account from at least one prepaid internet account, and the internet content is synchronized in background so that accessing of previously charged internet content will be free from further charges; and upon detecting that the internet connection is any other type of internet connection, the computer device caches any Internet content accessed by the user without charge to the designated prepaid internet account, and the internet content is synchronized on other computer devices in the system linked to the designated prepaid internet account.

2. The system according to claim 1, wherein the computer device is configured to detect whether the internet connection is the prepaid broadband connection based on speed of network.

3. The system according to claim 1, wherein if the internet connection is the prepaid broadband connection, the user is charged for updating cached Internet content, the updating is chargeable to the designated prepaid internet account.

4. The system according to claim 1, wherein if the internet connection is the prepaid broadband connection, the computer device notifies the user of the computer device that the Internet content accessed will be chargeable to the designated prepaid internet account before incurring the charge.

5. The system according to claim 1, wherein if the internet connection is the prepaid broadband connection, the user is charged for the Internet content based on a pay per action model.

6. The system according to claim 5, wherein the pay per action model is activated by sending a request from the computer device to a server, the server operable to, upon receiving the request, toggle between an existing billing infrastructure which implements a pay-per-specific time model and an independent billing module implementing the pay per action model.

7. The system according to claim 6, wherein each subsequent action to update or synchronize internet content to the server is charged or billed based on a flat fee for a defined set of subsequent actions.

8. The system according to claim 1, wherein the computer device is configured to cache and synchronize the Internet content accessed.

9. A method for detecting and charging for internet connection provided to a computer device of a user in a system, the computer device configured to detect any internet connection available comprising the following steps:

(a) detecting if the internet connection is a prepaid broadband connection;

(b) upon detecting that the internet connection is the prepaid broadband connection, charging for caching of any Internet content accessed by the user to a designated prepaid internet account, and synchronizing the internet content in background so that accessing of previously charged internet content will be free from further charges; or (c) upon detecting that the internet connection is any other type of internet connection, caching any internet content accessed by the user without charging to the designated prepaid internet account, and synchronizing the Internet content on other computer devices in the system linked to the designated prepaid internet account.

10. The method according to claim 9, wherein the computer device is configured to detect whether the internet connection is the prepaid broadband connection based on speed of network.

11. The method according to claim 9, wherein the step (b) further comprises a step of updating cached Internet content is chargeable to the designated prepaid internet account.

12. The method according to claim 9, wherein the step (b) further comprises a step of notifying the user of the computer device that the Internet content accessed will be chargeable to the designated prepaid internet account before incurring the charge.

13. The method according to claim 9, wherein the step (b) further comprises a step of charging of the Internet content based on a pay per action model.

14. The method according to claim 13, wherein the pay per action model is activated by sending a request from the computer device to a server, the server operable to, upon receiving the request, toggle between an existing billing infrastructure which implements a pay-per-specific time model and an independent billing module implementing the pay per action model.

15. The method according to claim 13, wherein each subsequent action to update or synchronize internet content is charged or billed based on a flat fee for a defined set of subsequent actions.

16. The method according to claim 9, wherein the computer device is configured for caching and synchronizing the Internet content accessed.

17. A computer device installed with software thereon, the software executable to perform the steps according to any of claims 9 to 16 to detect and charge for prepaid internet access.

18. The system according to claim 1 comprising:

a storage means in data communication with the computing device operable to store the internet content accessed by the user, wherein upon receiving the request from a user to access the internet content at the computing device, the computing device detects the internet connection, upon detection that the internet connection is the prepaid broadband connection, the computing device checks the storage means to determine if the internet content has been previously accessed and stored in the storage means, if the internet content has not been previously accessed by the user and not stored in the storage means, the computing device is operable to prompt the user to download and store the internet content in the storage means, and if the internet content has been previously accessed and stored in the storage means, the computing device is operable to retrieve the internet content previously accessed by the user from the storage means.

19. The system according to claim 18, wherein the storage means is a local drive in the computing device.

20. The system according to claim 19, wherein the local drive is further synchronized with an external server.

21. The system according to claim 20, wherein the synchronization to the external server database is performed when the internet connection is not the prepaid broadband connection.

22. The system according to claim 21, wherein the user is prompted with a warning when either the external server or the local drive reaches its memory limit.

23. The system according to claim 18, wherein the internet connection is part of a telecommunication network.

24. The system according to claim 18, wherein if the internet content has been accessed previously and stored in the storage means, the computing device is further operable to display a date on which the stored internet content is last updated.

25. The system according to claim 24, wherein if the internet content is not updated, the user is prompted to update the internet content.

26. The method according to claim 9, further comprising:
receiving a request to access the internet content from the user at the computing device;
detecting the internet connection by the computing device; and
upon detecting that the internet connection is the prepaid broadband connection, checking, by the computing device, a storage means to determine if the internet content has been previously accessed and stored in the storage means,
wherein if the internet content has not been previously accessed by the user and not stored in the storage means, the computing device is operable to prompt the user to download and store the internet content in the storage means,
if the internet content has been previously accessed and stored in the storage means, the computing device is operable to retrieve the internet content previously accessed by the user from the storage means.

27. The method according to claim 26, wherein the storage means is a local drive in the computing device.

28. The method according to claim 27, wherein the local drive is further synchronized with an external server.

29. The method according to claim 28, wherein the synchronization to the external server database is performed when the internet connection is not the prepaid broadband connection.

30. The method according to claim 29, wherein the user is prompted with a warning when either the external server or the local drive reaches its memory limit.

31. The method according to claim 26, wherein the internet connection is part of a telecommunication network.

32. The method according to claim 26, wherein if the internet content has been accessed previously and stored in the storage means, the computing device is further operable to display a date on which the stored internet content is last updated.

33. The method according to claim 32, wherein if the internet content is not updated, the user is prompted to update the internet content.

* * * * *